Sept. 14, 1926.  F. J. COOK  1,599,556
ELECTRIC COOKING DEVICE
Filed April 10, 1925    4 Sheets-Sheet 1

Inventor
Frank J. Cook
By
Attorney

Sept. 14, 1926.
F. J. COOK
1,599,556
ELECTRIC COOKING DEVICE
Filed April 10, 1925 4 Sheets-Sheet 2
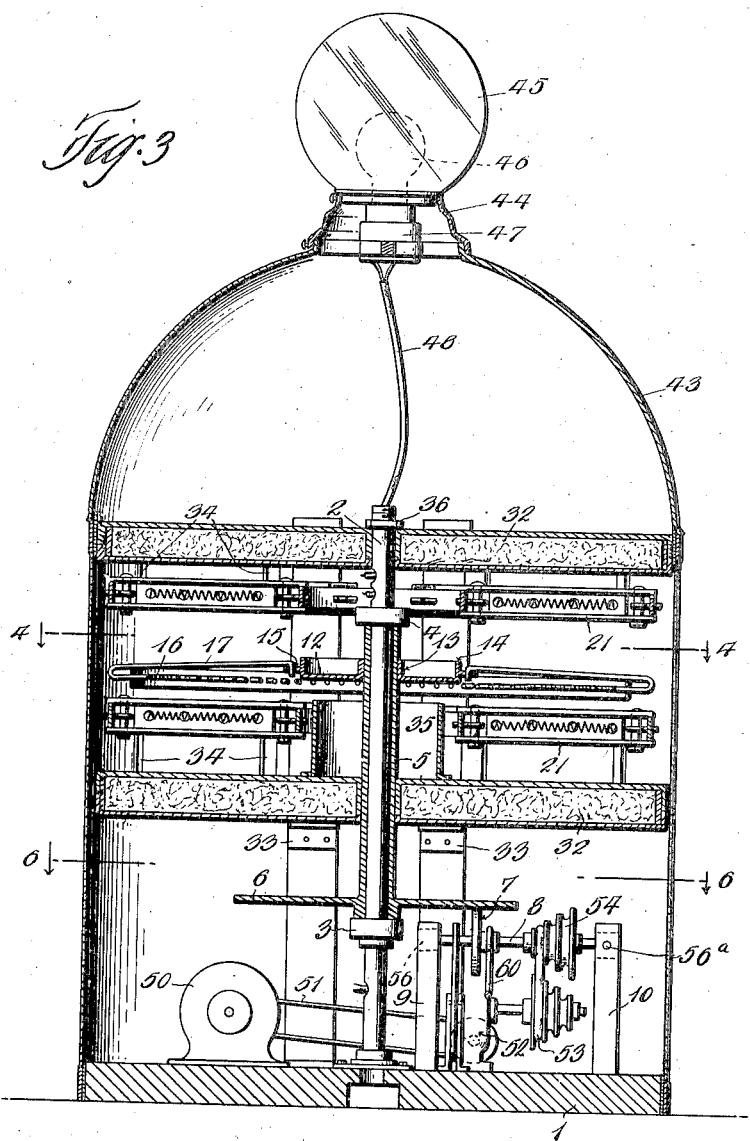
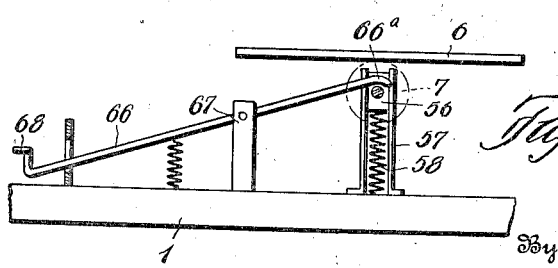

Sept. 14, 1926.
F. J. COOK
1,599,556
ELECTRIC COOKING DEVICE
Filed April 10, 1925        4 Sheets-Sheet 3
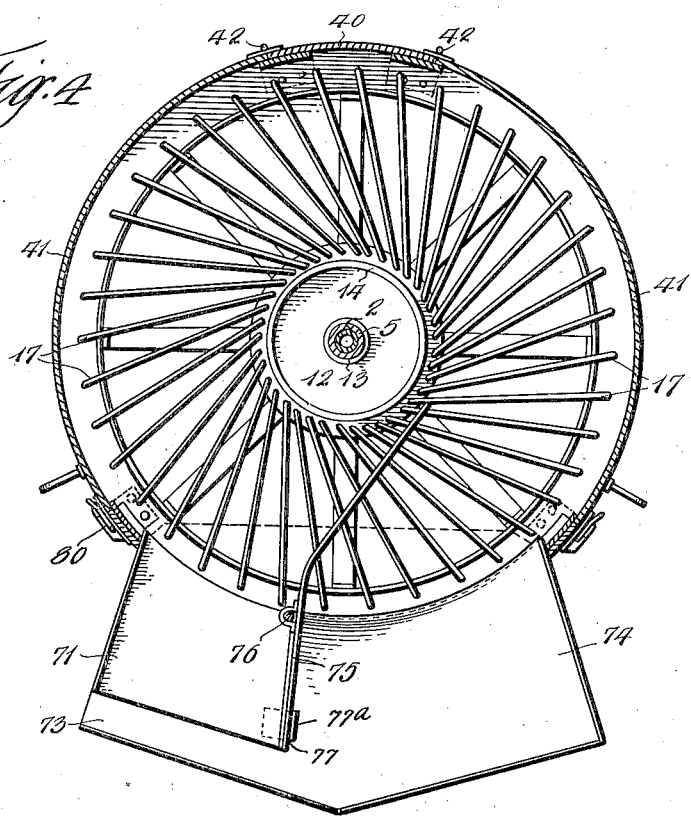
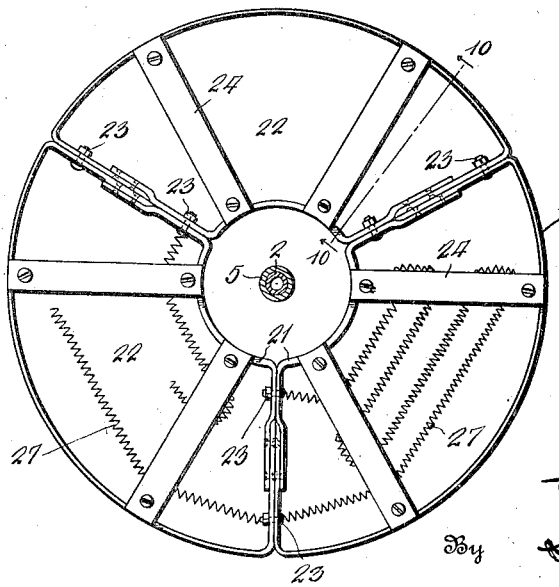
Inventor
Frank J. Cook
By Hull, Birch & West
Attorney Sept. 14, 1926.
F. J. COOK
1,599,556
ELECTRIC COOKING DEVICE
Filed April 10, 1925  4 Sheets-Sheet 4
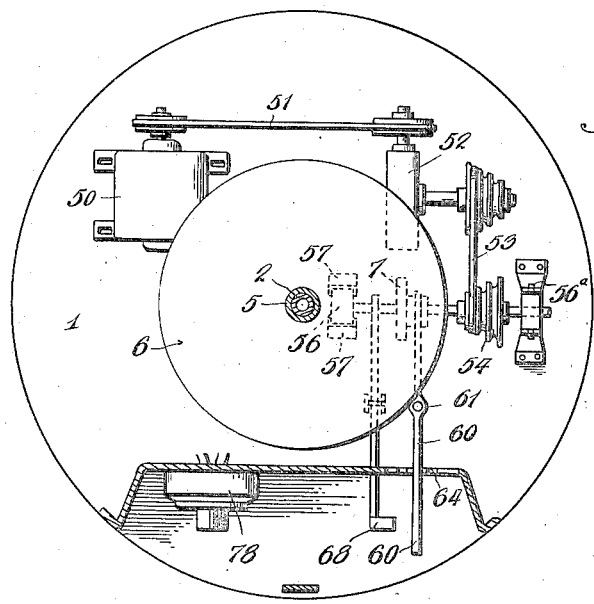
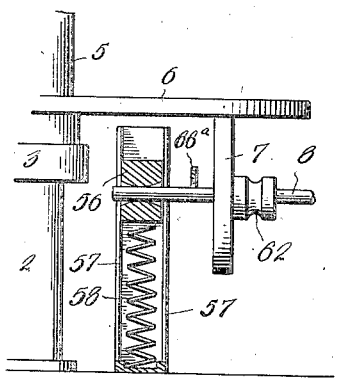
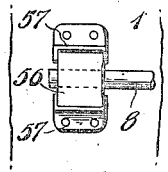
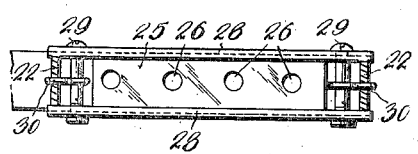
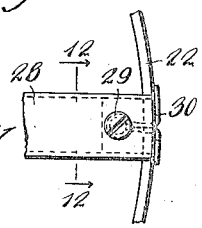
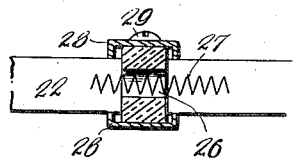
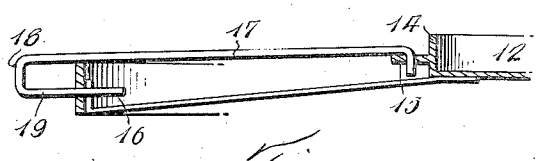

Patented Sept. 14, 1926

1,599,556

UNITED STATES PATENT OFFICE.

FRANK J. COOK, OF CLEVELAND, OHIO.

ELECTRIC COOKING DEVICE.

Application filed April 10, 1925. Serial No. 22,020.

This invention relates to electric cooking devices and is directed more particularly to a machine wherein food moves continuously therethrough and is cooked during such movement.

The primary object of the present invention is to provide a cooking device which is especially suitable for cafeterias, restaurants and other eating places, and which shall include a rotating food support for conveying the food through a heated oven so that only one operator shall be necessary to attend to the machine while the same is in operation.

Another object is to provide a machine of this character which shall include means for varying the oven heat and means for varying the speed of the rotating support, such means in each instance being capable of easy and quick adjustment so as to readily adapt the machine for toasting, frying, broiling or other cooking operations.

A further object is to provide a machine of this general character which shall be simple in construction, inexpensive of manufacture, efficient in operation, and which shall be capable of operating continuously over long periods without overheating or break-down.

A still further object is to provide a machine which shall be neat and attractive in appearance and which shall be readily accessible for purposes of cleaning or repair.

With these and other objects in view, the invention consists in the various novel features of construction and arrangement or combination, all of which will be fully described hereinafter and pointed out in the appended claims.

Figure 2:
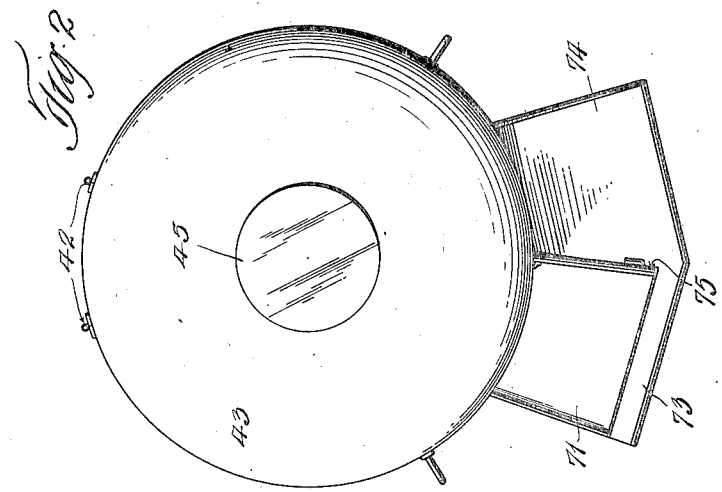
Figure 1:
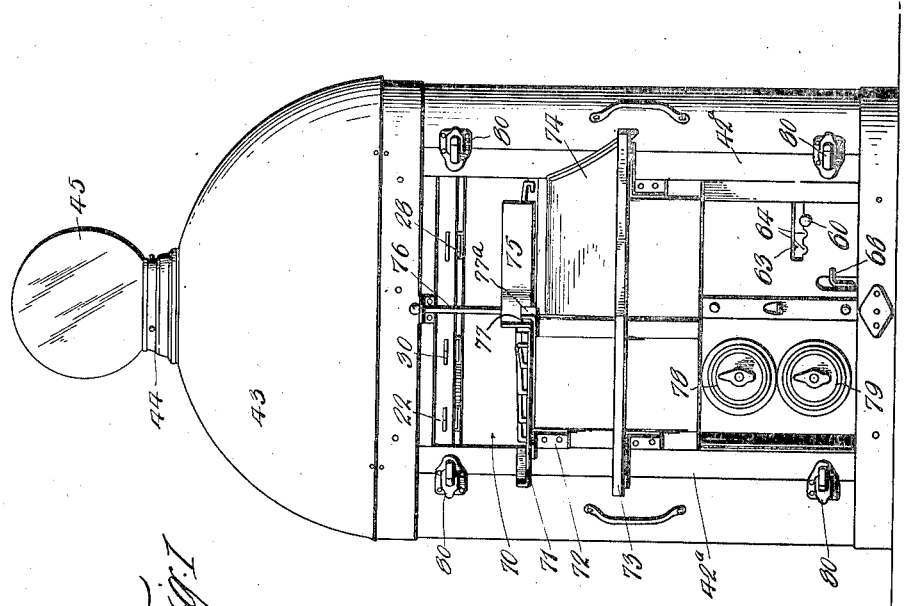

In the drawings accompanying and forming a part of this application, Fig. 1 is a front elevation of a machine constructed in accordance with my invention; Fig. 2 is a top plan view thereof; Fig. 3 is a vertical sectional view through the machine; Fig. 4 is a horizontal sectional view taken on the line 4—4 of Fig. 3; Fig. 5 is a plan view of one of the heating elements; Fig. 6 is a horizontal sectional view taken on the line 6—6 of Fig. 3; Fig. 7 is a fragmentary view, partly in section, of the friction drive mechanism; Fig. 8 is a detail top plan view of the yielding support employed in connection with the friction drive mechanism; Fig. 9 is a detail view in side elevation of the friction drive adjusting mechanism; Fig. 10 is a sectional view taken on the line 10—10 of Fig. 5; Fig. 11 is a fragmentary top plan view of one of the heating coil supports; Fig. 12 is a transverse sectional view taken on the line 12—12 of Fig. 11; and Fig. 13 is a detail sectional view of a portion of the rotating support, showing the method of fastening the supporting rod thereon.

Describing the various parts by reference characters, 1 denotes a circular base, from the central portion of which rises a hollow support 2. Fastened to the support adjacent its lower end is a thrust bearing 3 and adjacent its upper end there is provided a radial bearing 4, and interposed between these bearings is a sleeve 5 which is rotatably mounted on support 2. The lower end of sleeve 5 is provided with a friction disk 6 and operatively engaged with this disk is a friction drive wheel 7 which is fastened to a shaft 8 that is journaled in standards 9 and 10 which rise from base 1. A further detail description of the drive mechanism will appear hereinafter.

Fastened adjacent the upper end of sleeve 5 is a disk 12 having an inner upturned flange 13 which is adapted to closely embrace the sleeve 5, and an outer upturned flange 14 which is provided with a radially disposed flange 15. The disk 12 forms the inner member of the rotating support and this inner member is connected with an outer circular member 16 by a plurality of arms 17 and also by a plurality of rods 17ª fastened as shown in Fig. 13. The inner end of each rod 17ª is bent downwardly and engaged in an aperture formed in the flange 15 while the outer end of each rod 17ª is bent downwardly as indicated at 18 and then inwardly as at 19 so as to extend through an aperture in the outer band 16 of the rotating support. This construction permits free radial expansion and contraction of the rods 17ª and other elements of the rotating support, without danger of buckling or distorting the shape thereof. As shown in Fig. 4 it will be noted that I preferably arrange the rods 17ª at an angle with respect to a radius for a purpose to be referred to hereinafter.

Arranged above and below the rotating support is a circular heating unit denoted generally at 21 which is shown in detail in Fig. 5. These units are preferably each composed of sector shaped sections 22 which are bolted together at 23 to form a complete heating element. Each sector shaped unit may be conveniently formed of a strap metal frame, to which is fastened a plurality of heating coil supports 24. As shown in Figs. 10–12 inclusive, each heating coil support consists of a rectangular block of insulating material 25 having suitable apertures 26 therein to receive the wire resistance element 27, and these blocks 25 are supported by reversely disposed channels 28 which are bolted together adjacent each end as indicated at 29. The heating coil supports are secured to the strap metal frame by inserting bolts 29 through the eyes of cotter pins 30 which extend through the strap metal frame, and then deflecting the outer ends of such cotter pins over against the frame. The resistance wire 27 which forms the heating element has one end thereof connected to one of the bolts 23 which bolt is preferably insulated from the strap metal frame by insulating bushings (not shown) or any other suitable means, and such resistance element is then laced back and forth between supports 24 of one sector and connected at its opposite end with another of the bolts 23. An adjacent sector is wound in a similar manner and connected in series or parallel as will be explained hereinafter by connecting the ends of the resistance wire with bolts 23 of adjacent sectors to form such series or parallel connection. The lower heating unit is formed in a similar manner and it is disposed below the rotating support.

Disposed on the lower side of the lower heating unit, and on the upper side of the upper heating element, are heat insulating walls 32. These walls are fastened by means of brackets 33 to uprights 34 which rise from base 1, and the aforementioned heating units 21 are fastened to the respective heat insulating walls 32 by means of vertically disposed supports 34. By referring to Fig. 3, it will be noted that I preferably arrange a cylindrical sheet metal partition 35 between the lower heating element and the rotating sleeve 5 so as to protect such sleeve from the heat which might cause unequal expansion between the main support 2 and sleeve 5 and thereby cause binding between these parts. The upper end of support 2 passes through the upper heat insulating wall 32 and is fastened thereto by a nut 36 threaded on the upper end of the support.

A suitable sheet metal casing encloses the entire mechanism of the machine and this casing is preferably composed of a stationary panel 40 (Fig. 4) disposed on the rear of the machine, and arcuate side walls 41 which are hingedly supported at 42 from the stationary panel 40. The side walls are adapted to be latched at the front edges to uprights 42ᵃ as will be explained hereinafter. The side walls 41 and panel 40 extend upwardly from the base 1 to the upper heat insulating wall 32. A sheet metal dome 43 is applied to the top of the device and in turn supports an electric fixture 44 having a globe 45 and an electric light 46 arranged therein. The globe 45 is supported in a socket 47 which is electrically connected by wires 48 that extend through the hollow support 2 and are connected to a suitable source of current either direct or through a flasher mechanism so that the globe 45 will be illuminated either continuously or periodically for purposes of advertising.

The driving mechanism for the rotating support consists of a motor 50 which is mounted on the base 1 and connected by means of a belt 51 with a reduction gearing 52 which in turn is connected by a belt 53 with any of a series of pulleys 54 that are mounted on shaft 8. In practice I preferably mount one end of shaft 8 in a spring urged bearing block 56 as shown in Figs. 7 and 8 and the opposite end in a bearing block pivotally mounted at 56ᵃ. The block 56 is mounted for vertical movement between a pair of upright channels 57 which rise from base 1 and a spring 58 interposed between the base and bearing block tends normally to force the bearing block and shaft 8 upwardly to frictionally engage the drive wheel 7 with disk 6. The drive wheel 7 is shiftable longitudinally of shaft 8 by means of a lever 60 which is pivoted at 61 (Fig. 6) and has one end thereof forked and engaged about a grooved collar 62 projecting laterally from drive wheel 7, while the opposite end of lever 60 projects through an aperture 63 (Fig. 1) in the front of the machine and said lever may be engaged in any of a series of depressions 64 forming the lower edge of aperture 63 thereby to dispose friction wheel 7 at any of a series of radii along disk 6. In order to facilitate the adjustment of the drive wheel 7 with respect to disk 6, I preferably arrange a lever 66 as shown in Fig. 9, so as to disengage said drive wheel from the disk during radial movement thereof. The lever 66 is pivoted between suitable uprights 67 fastened to the base 1, and the inner end 66ᵃ of said lever is engaged over the shaft 8 while the outer end of the lever projects through the front of the casing and is provided with a handle portion 68. By pulling upwardly on the handle 68, the inner end 66ᵃ will be forced downwardly, thereby forcing the shaft 8 downwardly against the tension of spring 58 and disengaging drive wheel 7 from disk 6.

The front of the casing as shown in Fig. 1 is provided with an opening 70 adjacent the upper end thereof, the lower edge whereof is substantially level with the rotating support. One half of this opening, namely the left half as shown in Fig. 1, constitutes the receiving opening for inserting food on the rotating support, while the other half of the opening constitutes a discharge opening. A shelf 71 is fastened on suitable brackets 72 adjacent the lower edge of the inlet opening. Arranged below the shelf 71 is a receiving tray 73 which has a portion 74 bent upwardly and disposed in operative relation to the discharge side of opening 70. A guide bar 75 extends inwardly through opening 70 to a point substantially tangential to the inner disk of the rotating support, and the outer end portion of this bar is pivotally mounted on a vertically disposed pin 76 located at substantially the mid-point between the inlet and discharge portions of opening 70. The outer end of bar 75 is normally positioned in a slot 77 defined by shelf 71 and a strip 77ᵃ fastened thereto. Under certain conditions as will be explained hereinafter, the outer end of bar 75 may be disengaged and the bar rotated about pin 76 so that the inner end thereof may be swung outwardly, out of the path of food on the rotating support.

Suitable parallel series connection switches 78 and 79 are mounted on the front of the housing and one of these switches serves to control the current supplied to the upper heating units while the other of said switches controls the current supplied to the lower of said heating units. These switches are provided with a plurality of contacts which are connected in the usual manner to the heating units so that said units may be connected in series or parallel as desired.

In operation, switches 78 and 79 are rotated to connect the upper and lower heating elements across the line, current being supplied from a suitable source, through the switches and through wires extending upwardly through the hollow support 2 and thence leading to the respective heating elements. The motor 50 is started and the speed of the rotating support is adjusted by means of levers 68 and 60 as previously described and by shifting belt 53 to the desired pulley 54 if necessary. The food to be cooked, such as sandwiches to be toasted or other food, is inserted through the receiving side of opening 70 and placed on the rotating support. This support revolves at a predetermined speed sufficient to allow the food to become thoroughly cooked during the time it takes to make one complete revolution of the support. It will be understood that articles of food may be placed on the support either singly or one after another thereby partially or completely filling such support with food to be cooked. After the support has made substantially one complete revolution, the cooked article will be moved against the bar 75 and continued movement of the rotary support will force the article off of the support and through the discharge side of the opening 70 onto the inclined portion 74 of tray 73. In this connection it will be noted from Fig. 4 that the rods 17 of the rotating support are disposed at substantially right angles to bar 75 and movement of the food off of the support through the discharge opening will be along the longitudinal axes of rods 17 and hence there will be no danger of binding at this point.

It is thus apparent that only one operator is required to insert the food to be cooked in the receiving side of opening 70 and dispose of the cooked food emerging from the discharge side of such opening. When it is desired to expose certain class of foods to heat for a longer period than one revolution of the rotating support, the operator merely inserts the food on the rotating support in the usual manner and then raises the outer projecting end of bar 75 above the shelf 71 and pushes said bar across the receiving opening. This deflects the inner end of bar 75 to one side of the rotating support and hence the articles to be cooked may make as many revolutions as desired in order to produce a thoroughly cooked article.

The interior mechanism is readily accessible for purposes of repair or cleaning by unlatching the fastening members 80 and swinging the hinged side walls 41 about their hinges 42 thereby exposing the entire interior of the machine. The heating elements each being constructed of sector shaped units, may be easily repaired by removing the particular sector which is damaged through the side of the machine and inserting a new sector. The peculiar construction of the rotating support permits the rods 17 and associated parts to expand and contract freely without distorting the circular shape of the support. By confining the heat from the heating elements between the heat insulating walls, the heat is concentrated on the food to be cooked and at the same time the machine remains cool on the exterior thereof.

The machine as a whole presents a neat and attractive appearance and may be easily attended to by one operator.

Having thus described my invention, what I claim is:—

1. A cooking device of the character set forth comprising a casing, a rotating support within said casing, heating means disposed above and below said support to provide an intense heat for the article of food to be cooked, an opening in said casing for placing articles of food on said support, a discharge opening adjacent the first mentioned opening and means for automatically discharging the cooked food from said support through said discharge opening.

2. A cooking device of the character set forth comprising a casing, a food support journaled within said casing, means for rotating said support at variable speeds, controls projecting through said casing for adjusting said means, heating means disposed in operative relation to said support, heat insulating means enclosing said support and heating means, said casing being provided with an opening to permit articles of food to be placed on said support and a discharge opening adjacent thereto and means for automatically discharging the cooked food from said rotating support through said discharge opening.

3. A cooking device of the character set forth comprising a casing, a rotary food support journaled within said casing, heating means disposed in operative relation to said food support, heat insulating walls arranged above and below said heating means and food support to define an oven, and an electric motor disposed below said heat insulating walls and operatively connected to said food support.

4. A cooking device of the character set forth comprising a base, a tubular support rising from said base, a sleeve journaled on said support, a food support carried by said sleeve, electric heating units arranged above and below said food support, wires extending through said tubular support and connected to said heating units, and means for rotating said sleeve and food support.

5. A cooking device of the character set forth comprising a base, a tubular support rising from said base, a sleeve journaled on said support, a food support carried by said sleeve, electric heating means disposed in operative relation to said food support, wires extending through said tubular support and connected to said heating units, a friction disk carried by said sleeve, a friction wheel adapted to engage said disk at variable radii, and means for driving said friction wheel.

6. A cooking device of the character set forth comprising a casing, a base within said casing a support rising from said base, a sleeve journaled on said support, a food support carried by said sleeve, electric heating means disposed in operative relation to said food support, a friction disk carried by said sleeve, a friction wheel adapted to engage said disk at variable radii, means for urging said wheel into contact with said disk, a lever projecting through said casing for shifting said wheel with respect to said disk, and an electric motor within said casing and operatively connected to said wheel.

7. A cooking device of the character set forth comprising a casing, a rotating support within said casing, heating means disposed in operative relation to said support, said casing being formed with an opening for placing articles of food on said support, and an arm extending through said opening and into said casing and disposed in operative relation to said support thereby to deflect the cooked food from said support, said arm dividing said opening into an intake and discharge opening.

8. A cooking device of the character set forth comprising a base, a post rising from said base, a food support journaled on said post, said food support comprising inner and outer circular members arranged in spaced relation and interconnected by a plurality of rods slidably engaged therewith, heating units disposed above and below said food support, and means for rotating said food support.

9. A cooking device of the character set forth comprising a base, a rotating support mounted on said base, heating means disposed in operative relation to said support, means for placing articles of food on said support, means for discharging the cooked food from said support, and a casing enclosing said support and heating means, the side walls of said casing being adapted to open to expose substantially the entire portion of said support and heating means.

10. A cooking device of the character set forth comprising a cylindrical casing, a circular rotating support within said casing, electric heating means disposed above and below said support, said casing being formed with an opening to permit the placing of articles of food on said support, a bar projecting into said casing through said opening in operative relation to said support and adapted to automatically discharge the cooked food from said support.

11. A cooking device of the character set forth comprising a base, a support rising from said base, a sleeve journaled on said support, a food support carried by said sleeve, said food support being composed of inner and outer members interconnected by a plurality of rods slidably connected thereto, electric heating units arranged above and below said food support, heat insulating walls arranged above and below said heating units to define an oven, and an electric motor located beneath said heat insulating walls for rotating said sleeve and food support.

12. A cooking device of the character set forth comprising a casing, a vertically disposed sleeve journaled in said casing, a rotary food support mounted on said sleeve, electric heating means disposed above and below said food support, heat insulating walls arranged above and below said heating means, a motor disposed below said heat insulating walls, a friction disk carried by said sleeve, a drive wheel adapted to contact with said disk at variable radii, means operatively connecting said motor with said drive wheel, and a control lever projecting through said casing for moving said drive wheel.

13. A cooking device of the character set forth comprising a base, a tubular support rising from said base, a sleeve journaled on said support, a food support carried by said sleeve, and rotatable therewith, electric heating means disposed above and below said food support, wires extending through said tubular support and connected with said heating means, a friction disk carried by said sleeve, a friction wheel adapted to engage said disk at variable radii, means normally urging said wheel into contact with said disk, a casing enclosing the device, means projecting through said casing for disengaging said wheel from said disk, means projecting through said casing for shifting said wheel with respect to said disk, and means for driving said wheel.

14. A cooking device of the character set forth comprisng a base, a post rising from said base, a food support journaled on said post, said food support comprising inner and outer circular members arranged in spaced relation and interconnected by a plurality of rods, said rods being slidably engaged with said members to permit free expansion and contraction of said food support, heating units disposed above and below said food support, and means for rotating said food support.

15. In a cooking device of the character set forth, the combination with a base, of a casing rising from said base, said casing having hinged sections adapted to open to expose the interior thereof, a food support journaled within said casing, electric heating means arranged above and below said food support, means for rotating said food support, and means for varying the speed of rotation of said food support.

16. A food support comprising inner and outer circular shaped members arranged in spaced relation, and rods interconnecting said members, said rods being slidably connected at each end to said members to permit free expansion and contraction of said support with changes in temperature.

17. A food support comprising inner and outer circular shaped members arranged in spaced relation, rods interconnecting said members, said rods being provided with a down turned portion engaged in apertures in said inner member, said rods each being formed at its opposite end with a downwardly and inwardly extending portion, said inwardly extending portions of said rods being engaged in apertures in said outer member.

In testimony whereof, I hereunto affix my signature.

FRANK J. COOK.